(12) United States Patent
Sugino et al.

(10) Patent No.: US 6,831,713 B2
(45) Date of Patent: Dec. 14, 2004

(54) POLARIZING PLATE HAVING ALL SURFACES AND SIDES COVERED WITH LOW MOISTURE-PERMEABLE LAYERS AND LIQUID CRYSTAL DISPLAY USING THE SAME

(75) Inventors: Youichirou Sugino, Ibaraki (JP); Eiji Hamamoto, Ibaraki (JP); Seiichi Kusumoto, Ibaraki (JP); Hisashi Mihara, Ibaraki (JP); Senri Kondou, Ibaraki (JP); Kazuki Tsuchimoto, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 4 days.

(21) Appl. No.: 10/072,804

(22) Filed: Feb. 8, 2002

(65) Prior Publication Data

US 2003/0151706 A1 Aug. 14, 2003

(51) Int. Cl.$^7$ .............................................. G02F 1/1335
(52) U.S. Cl. ........................ 349/96; 359/507; 359/512
(58) Field of Search ........................... 349/96; 359/485, 359/507, 512

(56) References Cited

U.S. PATENT DOCUMENTS

| 4,617,207 | A | * | 10/1986 | Ueki et al. .................. 428/1.31 |
| 6,320,042 | B1 | * | 11/2001 | Michihata et al. ............. 536/69 |
| 2002/0102369 | A1 | * | 8/2002 | Shimizu et al. ............. 428/1.33 |
| 2002/0160172 | A1 | * | 10/2002 | Shimizu et al. ............. 428/220 |
| 2002/0192397 | A1 | * | 12/2002 | Tsujimoto .................. 428/1.31 |
| 2003/0001987 | A1 | * | 1/2003 | Trapani et al. ................. 349/96 |
| 2003/0002154 | A1 | * | 1/2003 | Trapani et al. .............. 359/492 |

FOREIGN PATENT DOCUMENTS

JP          60-083903 A    *   5/1985

* cited by examiner

Primary Examiner—Tarifur R. Chowdhury
(74) Attorney, Agent, or Firm—Westerman, Hattori Daniels & Adrian LLP

(57) ABSTRACT

A polarizing plate having excellent moisture durability and a liquid crystal display using the same are disclosed. The polarizing plate is produced by covering all surfaces and sides of a polarizer with low moisture-permeable layers having moisture permeability of 310 g/m$^2$·24 h or less. The rate of change in dimension of the polarizer in the uniaxially stretched direction is ±0.1% or less after left at a temperature of 60° C. and humidity of 95% for 100 hours.

24 Claims, 1 Drawing Sheet

POLARIZING PLATE HAVING ALL SURFACES AND SIDES COVERED WITH LOW MOISTURE-PERMEABLE LAYERS AND LIQUID CRYSTAL DISPLAY USING THE SAME

BACKGROUND OF THE INVENTION

1. Field of the Invention

The present invention relates to a polarizing plate used for a liquid crystal display (LCD) and a liquid crystal display using such a polarizing plate.

2. Description of the Prior Art

Recently, the demand for LCDs used for devices, such as personal computers has increased sharply. Applications for LCDs have also broadened. Recently, LCDs are used for monitoring as well.

A polarizing plate used for a LCD may be manufactured, for example, by a method including the steps of: dyeing a polyvinyl alcohol (PVA) film with dichroic iodine or a dichroic dyestuff; crosslinking the film with boric acid, borax, or the like; stretching the film uniaxially, followed by drying the film and sticking it to a protective layer such as a triacetylcellulose (TAC) film. The respective steps of dyeing, crosslinking and stretching are not necessarily carried out separately and can be carried out simultaneously. Furthermore, there is no limitation on the order of the steps.

When a polarizer is used after being formed, it may deteriorate due to problems in handling or the influence of moisture. Therefore, protective layers, such as triacetylcellulose films etc., are attached to both surfaces of the polarizer, thereby producing a polarizing plate.

In the above-mentioned configuration, when the polarizing plate is cut out into a size on a liquid crystal panel, both surfaces of the polarizer are covered with the protective layers such as triacetylcellulose films etc. but the polarizer made of a hydrophilic high polymer film is exposed at the sides of the cut-out polarizing plate. As a result, in conventional polarizing plates used for liquid crystal displays have a problem in that the change in dimension may be increased due to the change of moisture in the polarizer when left at high humidity for a long time. This may lead to problems in handling a panel when a liquid crystal panel is equipped, or to deterioration of the polarizing function.

SUMMARY OF THE INVENTION

In one aspect, the present invention relates to a polarizing plate having humidity durability, and a liquid crystal display using such a polarizing plate.

In one embodiment of the present invention, the polarizing plate includes a polarizer having all surfaces and sides covered with low moisture-permeable layers having moisture permeability of 310 g/m$^2$·24 h or less.

In some embodiments, the polarizing plate has a rate of change in dimension in the uniaxially stretching direction of ±0.1% or less after left at a temperature of 60° C. and humidity of 95% for 100 hours.

In some embodiments, the polarizing plate is formed into a size of 90 mm×90 mm and attached to a plastic cell having a size of 100 mm×100 mm and a thickness of 400 μm and made of a thermoplastic resin or a thermosetting resin, such that when the cell is left at a temperature of 60° C. and humidity of 95% for 100 hours, the amount of warping at four corners of the cell is ±3.0 mm or less. In some embodiments, the thermoplastic resin is at least one selected from the group consisting of polycarbonate, polyalylate, polyether sulfone, polysulfone, polyester, polymethyl methacrylate, polyetherimide. In some embodiments, polyamide; and the thermosetting resin is at least one selected from the group consisting of epoxy resin, unsaturated polyester, polydiaryl phthalate and polyisobonyl methacrylate.

In some embodiments, the polarizing plate includes a reflector or a transreflector attached to the polarizing plate.

In some embodiments, the polarizing plate includes a retardation plate or a λ plate attached to the polarizing plate.

In some embodiments, the polarizing plate includes a viewing angle compensating film attached to the polarizing plate.

In some embodiments, the polarizing plate includes a brightness-enhanced film attached to the polarizing plate.

In some embodiments of the invention, a liquid crystal display uses a polarizing plate in accordance with the invention on at least one side of a liquid crystal cell.

DESCRIPTION OF THE PREFERRED EMBODIMENTS

Figure 1:
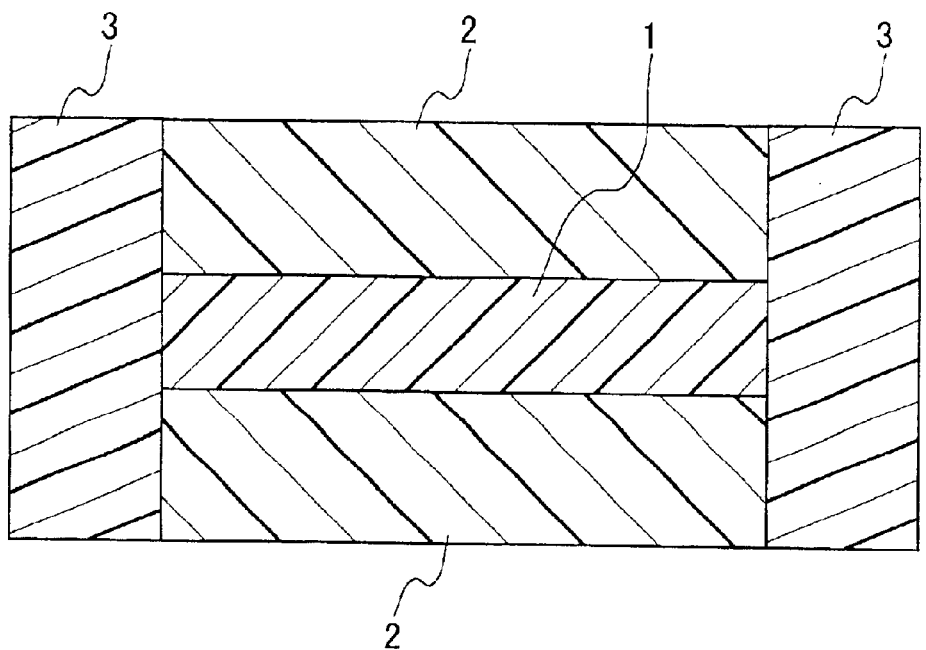
FIG. 1 is a cross-sectional view showing a polarizing plate according to Example 1 of the present invention.

In one embodiment of the present invention, all surfaces and sides of a polarizer are provided with low moisture-permeable layers having moisture permeability of 310 g/m$^2$·24 h or less. As a result, the change in dimension of the polarizing plate may be reduced even if the polarizing plate is left at high humidity for a long period of time.

An example of a method for providing the low moisture-permeable layer on the sides of the polarizing plate may include, for example, a method of directly coating a low moisture-permeable resin having moisture permeability of 3.9 g/m$^2$·24 h or less, or attaching a low moisture-permeable film having moisture permeability of 310 g/m$^2$·24 h or less.

Another method may include cutting out the polarizer formed by dying with iodine and stretching into a size for an equipped liquid crystal panel, and providing a low moisture-permeable layer directly on the entire surface of the polarizer film.

In a basic configuration of a polarizing plate according to the present invention, a transparent protective film may be adhered to one side or both sides of the polarizer as a protective layer. The transparent protective film may be made of a polyvinyl alcohol-based polarizing film containing dichroic substance, and the like. The transparent protective film may be adhered via an appropriate adhesive layer, for example, a layer of adhesive made of, for example, a vinyl alcohol-based polymer.

A polarizer (polarizing film) made of an appropriate vinyl alcohol-polymer film that are known in the art, for example, polyvinyl alcohol film, a partially formalized polyvinyl alcohol film, or the like, i.e., an absorbing polarizer, is subjected to appropriate treatment such as dyeing with dichroic substances such as iodine and a dichroic dyestuff, stretching, crosslinking into any suitable orders and manners. Any polarizer can be used, as long as it allows linearly polarized light to pass through the film when natural light enters. In some embodiments, a polarizer with an excellent light transmittance and a polarization degree may be preferred.

As a material for the protective film forming a transparent protective layer provided on one side or both sides of the polarizer (polarizing film), an appropriate transparent film can be used. As the polymer, for example, an acetate-based resin such as triacetylcellulose may be used. However, the polymer is not necessarily limited thereto.

When some factors such as polarizing properties and durability are taken into consideration, a preferred transparent protective film may be a triacetylcellulose film having a surface saponified with alkali or the like. The transparent protective film to be provided on both surfaces of a polarizing film may be a film having surface polymers distinguished from the polymers on the backside.

The transparent protective film used for the protective layer may be subject to treatment for providing properties such as hard coating, antireflection, anti-sticking, dispersion, or anti-glaring, as long as the advantages of the present invention are not lost. Hard coating treatment may be carried out to prevent scratches on the surfaces of the polarizing plate by, for example, applying a surface of the transparent protective film with a coating film of a hardening resin (e.g., a silicon-based ultraviolet hardening resin) having excellent hardness and smoothness, etc.

Antireflection treatment may be carried out to prevent reflection of outdoor daylight on the surface of the polarizing plate by, for example, forming an anti-reflection film in a conventional manner. Anti-sticking treatment may be carried out to prevent adjacent layers from sticking to each other. Anti-glaring treatment may be carried out to prevent visibility of light passing through the polarizing plate from being hindered by outdoor daylight reflected on the surface of the polarizing plate. The anti-glaring treatment can be carried out by providing microscopic asperities on a surface of a transparent protective film in an appropriate manner, for example, by roughening the surface by sand-blasting or embossing, by blending transparent particles, or the like.

An example of transparent fine particles includes silica, alumina, titania, zirconia, stannic oxide, indium oxide, cadmium oxide, antimony oxide or the like, which have an average particle diameter ranging from 0.5 $\mu$m to 20 $\mu$m. Inorganic fine particles having electroconductivity may also be used. Alternatively, organic fine particles including, for example, crosslinked or uncrosslinked polymer particles, etc. may be used. The amount of the transparent fine particles may range generally from 2 parts by weight to 70 parts by weight, and particularly from 5 parts by weight to 50 parts by weight for 100 parts by weight of the transparent resin.

An anti-glare layer including transparent fine particles may be provided as the transparent protective layer or a coating layer applied onto the surface of the transparent protective layer. The anti-glare layer may also function as a diffusion layer to diffuse light passing through the polarizing plate in order to enlarge viewing angle (this function is referred to as a viewing angle compensating function). The above-mentioned layers such as the antireflection layer, the anti-sticking layer, the diffusion layer, and the anti-glare layer may be provided separately from the transparent protective layer as an optical layer, for example, in sheet form including the above-mentioned layers.

There is no specific limitation on the treatment for adhering the polarizer (polarizing film) to the transparent protective film that is a protective layer. Adhesion may be carried out, for example, by using an adhesive such as an adhesive including a vinyl alcohol-based polymer, or an adhesive including at least a water-soluble crosslinking agent of vinyl alcohol-based polymer such as boric acid, borax, glutaraldehyde, melamine and oxalic acid. A layer of such an adhesive can be formed by, for example, applying and drying an aqueous solution. In preparation of the aqueous solution, other additives, a catalyst such as an acid can be blended if necessary.

In a practical use, a polarizer may be used as an optical member that is laminated onto another optical layer. Although there is no specific limitation on the optical layer, one or two or more of appropriate optical layer(s) applicable for formation of a liquid crystal display, etc. can be used. An example of an optical layer includes, for example, a reflector, a transreflector, a retardation plate (such as a $\lambda$ plate like a half wavelength plate and a quarter wavelength plate), a viewing angle compensating film, a brightness-enhanced film, and the like. Examples of a polarizing plate include a reflective polarizing plate or a semitransparent polarizing plate formed by laminating a reflector or a transreflector on the above-mentioned polarizing plate including a polarizer and a protective layer according to the present invention; an elliptical polarizing plate or a circular polarizing plate formed by laminating a retardation plate on the above-mentioned polarizing plate including a polarizer and a protective layer; a polarizing plate formed by laminating a viewing angle compensating film on the above-mentioned polarizing plate including a polarizer and a protective layer; and a polarizing plate formed by laminating a brightness-enhanced film on the above-mentioned polarizing plate including a polarizer and a protective layer.

A reflector may be provided on a polarizing plate to form a reflective polarizing plate. In general, such a reflective polarizing plate is provided on the backside of a liquid crystal cell to make a liquid crystal display, etc. to display by reflecting incident light from a visible side (display side). The reflective polarizing plate has some advantages, for example, light sources such as backlight need not be built in, and thus the liquid crystal display can be thinner.

The reflective polarizing plate can be formed in an appropriate manner such as attaching a reflecting layer made of, for example, metal on one surface of the polarizing plate via, for example, the above-mentioned transparent protective film as required. In a specific example, a reflecting layer may be formed by attaching a foil of a reflective metal such as aluminum or a deposition film on one surface of the transparent protective film that has been subjected to matting treatment as required.

Another example of a reflective polarizing plate includes the above-mentioned transparent protective film having a surface of microscopic asperities due to fine particles contained and a reflecting layer corresponding to the microscopic asperities. The reflecting layer having a surface with microscopic asperities diffuses incident light irregularly, so that directivity and glare can be prevented and irregularity in color tones can be controlled. This transparent protective film can be formed by attaching a metal directly onto a surface of a transparent protective film by any appropriate methods including deposition such as vacuum deposition, and plating such as ion plating and sputtering.

Furthermore, the reflector can be used as, for example, a reflecting sheet formed by providing a reflecting layer onto an appropriate film similar to the transparent protective film, instead of the above-mentioned method of producing a reflector directly on the transparent protective film of the polarizing plate. The reflecting layer of the reflector, which generally is made of metal, is preferably used with its surface covered with a film, a polarizing plate or the like, so the reduction of reflectance due to oxidation can be prevented, the initial reflectance can be maintained for a long time, an additional protective layer need not be formed, or the like.

A semitransparent polarizing plate may be obtained by using a semitransparent reflecting layer such as a half mirror, which reflects light and transmits light, as the reflecting layer in the above. In general, the semitransparent polarizing plate is provided on the backside of a liquid crystal cell. When a liquid crystal display is used in a relatively bright atmosphere, the semitransparent polarizing plate allows an incident light from the visible side (display side) to be reflected to display an image, while in a relatively dark atmosphere, an image is displayed by using a built-in light source such as a backlight in the backside of the semitransparent polarizing plate. In other words, the semitransparent polarizing plate can be used to form a liquid crystal display that can save energy for a light source such as a backlight under a bright atmosphere, while a built-in light source can be used under a relatively dark atmosphere.

An example of an elliptical polarizing plate or a circular polarizing plate in which a retardation plate is additionally laminated on the above-mentioned polarizing plate including a polarizer and a protective layer will now be described.

A retardation plate is used for modifying linearly polarized light to either elliptical polarized light or circular polarized light, modifying elliptical polarized light or circular polarized light to linearly polarized light, or modifying a polarization direction of linearly polarized light. In particular, a retardation plate called a quarter wavelength plate ($\lambda/4$ plate) is used for modifying linearly polarized light to circular polarized light, and for modifying circular polarized light to linearly polarized light. A half wavelength plate ($\lambda/2$ plate) is generally used for modifying a polarization direction of linearly polarized light.

The elliptical polarizing plate is effective in compensating (preventing) colors (blue or yellow) generated due to birefringence in a liquid crystal layer of a super twist nematic (STN) liquid crystal display so as to provide a black-and-white display free from the above-mentioned colors. Controlling three-dimensional refractive index may be further preferred because it can compensate (prevent) colors observed when looking at a screen of the liquid crystal display from an oblique direction. A circular polarizing plate is effective, for example, in adjusting color tones of an image of a reflective liquid crystal display that has a color image display, and it also serves to prevent reflection as well.

Examples of a retardation plate includes, for example, a birefringent film prepared by stretching an appropriate polymer film, an oriented film of a liquid crystal polymer, and an oriented layer of a liquid crystal polymer that is supported by a film, and the like. Examples of the polymer include, polycarbonate, polyvinyl alcohol, polystyrene, polymethyl methacrylate, polyolefins such as polypropylene, polyalylate, and polyamide. The incline-oriented film may be prepared by, for example, bonding a heat shrinkable film to a polymer film and subjecting the polymer film to stretching treatment and/or shrinking treatment under the influence of a shrinkage force by heat, or by orienting obliquely a liquid crystal polymer.

An example of a polarizing plate in which a viewing angle compensating film is additionally laminated on the above-mentioned polarizing plate including a polarizer and a protective layer will now be described.

A viewing angle compensating film is used for widening a viewing angle so that an image can be seen relatively clearly even when a screen of a liquid crystal display is viewed from a slightly oblique direction.

As the viewing angle compensating film, a triacetylcellulose film etc. coated with a discotic liquid crystal, or a retardation plate may be used. While an ordinary retardation plate is a birefringent polymer film that is stretched uniaxially in the face direction, a retardation plate used as the viewing angle compensating film is a two-way stretched film such as a birefringent polymer film stretched biaxially in the face direction, or an incline-oriented polymer film with a controlled refractive index in the thickness direction that is stretched uniaxially in the face direction and stretched also in the thickness direction. The incline-oriented film is prepared by, for example, bonding a heat shrinkable film to a polymer film and subjecting the polymer film to stretching treatment and/or shrinking treatment under an influence of shrinkage force by heat, or by obliquely orienting a liquid crystal polymer. A polymer as a material of the retardation plate may be similar to the polymer used for the above-mentioned retardation plate.

A polarizing plate in which a brightness-enhanced film is attached to the above-mentioned polarizing plate including a polarizer and a protective layer is generally arranged on the backside of a liquid crystal cell. When natural light enters by the backlight of the liquid crystal display etc. and reflection from the backside and the like, the brightness-enhanced film reflects linearly polarized light of a predetermined polarizing axis or circularly polarized light in a predetermined direction, while transmitting other light. The polarizing plate in which the brightness-enhanced film is laminated on the above-mentioned polarizing plate including a polarizer and a protective layer allows entrance of light from a light source such as a backlight to obtain transmitted light in a predetermined polarization state, while reflecting light other than light in the predetermined polarization state. Light reflecting by the brightness-enhanced film is reversed through a reflecting layer or the like arranged additionally behind the brightness-enhanced film. The reversed light is allowed to re-enter the brightness-enhanced plate. The re-entering light is transmitted partly or entirely as light in a predetermined polarization state so as to increase the amount of light passing through the brightness-enhanced film and polarized light that is hardly absorbed in the polarizer is supplied so as to increase the amount of light available for the liquid crystal display, etc. Thus, the brightness can be improved. When light enters through a polarizer from the backside of the liquid crystal cell by using a backlight or the like without using any brightness-enhanced films, most of the light having a polarization direction inconsistent with the polarization axis of the polarizer is absorbed in the polarizer but not transmitted by the polarizer. Depending on the characteristics of the polarizer, about 50% of light is absorbed in the polarizer, which decreases the quantity of light available in the liquid crystal display, or the like, and makes the image dark. The brightness-enhanced film repeatedly prevents light having a polarization direction to be absorbed in the polarizer from entering the polarizer to reflect the light on the brightness-enhanced film, and reverses the light through a reflecting layer or the like provided behind the brightness-enhanced film to make the light re-enter the brightness-enhanced plate. Because the brightness-enhanced film transmits the polarized light that is reflected and reversed between the brightness-enhanced film and the reflecting layer only if the polarized light has a polarization direction to pass the polarizer, light from a backlight or the like can be used efficiently for displaying images of a liquid crystal display in order to provide a bright screen.

Examples of a brightness-enhanced film include, for example, a film which transmits a linearly polarized light having a predetermined polarization axis and reflects other light, for example, a multilayer thin film of a dielectric or a multilayer laminate of thin films with varied refraction aeolotropy; a film that reflects either clockwise or counter-clockwise circular polarized light while transmitting other light, for example, a cholesteric liquid crystal layer, more specifically, an oriented film of a cholesteric liquid crystal polymer or an oriented liquid crystal layer supported on a supportive substrate, or the like.

Therefore, with the brightness-enhanced film transmitting a linearly polarized light having a predetermined polarization axis, the transmitted light directly enters the polarizing plate with the polarization axes matched, so that absorption loss due to the polarizing plate is controlled and the light can be transmitted efficiently. On the other hand, with the brightness-enhanced film transmitting a circular polarized light, such as a cholesteric liquid crystal layer, the transmission circular polarized light is converted to linearly polarized light before entering the polarizing plate in an aspect of controlling of the absorption loss, though the circular polarized light can enter the polarizer directly. Circular polarized light can be converted to linearly polarized light by using a quarter wavelength plate as a retardation plate.

A retardation plate having a function as a quarter wavelength plate in a wide wave range of a visible light region can be obtained, for example, by overlapping a retardation layer functioning as a quarter wavelength plate for monochromatic light such as light having 550 nm wavelength and another retardation plate showing a separate optical retardation property, for example, a retardation plate functioning as a half wavelength plate. Therefore, a retardation plate arranged between a polarizing plate and a brightness-enhanced film can include a single layer or at least two layers of retardation layers.

A cholesteric liquid crystal layer also can be provided by combining layers different in the reflection wavelength and it can be configured by overlapping two or at least three layers. As a result, the obtained retardation plate can reflect circular polarized light in a wide wavelength region of a visible light region, thus providing transmission circular polarized light in a wide wavelength region.

Furthermore, a polarizing plate can be formed by laminating a polarizing plate and two or at least three optical layers like the above-mentioned polarization separating type polarizing plate. Therefore, the polarizing plate can be a reflective elliptical polarizing plate, a semitransparent elliptical polarizing plate or the like, which is prepared by combining the above-mentioned reflective polarizing plate or a semitransparent polarizing plate with a retardation plate. An optical member including a lamination of two or at least three optical layers can be formed in a method of laminating layers separately in a certain order for manufacturing a liquid crystal display etc. or in a method for preliminary lamination. Because an optical member that has been laminated previously has excellent stability in quality and assembling operability, efficiency in manufacturing a liquid crystal display can be improved. Any appropriate adhesion means such as a pressure sensitive adhesive layer can be used for lamination.

The pressure sensitive adhesive layer can be provided on a polarizing plate or on an optical member for adhesion with other members such as a liquid crystal cell. The adhesive layer can be formed by the conventional appropriate pressure sensitive adhesives such as an acrylic pressure sensitive adhesive. Pressure sensitive adhesives having a low moisture absorption coefficient and an excellent heat resistance may be preferred from aspects of prevention of foaming or peeling caused by moisture absorption, prevention of decrease in the optical properties and warping of a liquid crystal cell caused by difference in thermal expansion coefficients, formation of a high quality liquid crystal display having excellent durability, etc. The pressure sensitive adhesive layer may contain fine particles to obtain optical diffusivity. Pressure sensitive adhesive layers can be provided on necessary surfaces if required. For example, the polarizing plate including a polarizer and a protective layer can be provided with a pressure sensitive adhesive layer on at least one surface of the protective layer as required.

When a pressure sensitive adhesive layer provided on the polarizing plate or the optical member is exposed on the surface, preferably, the pressure sensitive adhesive layer is temporarily covered with a separator for preventing contamination by the time the pressure sensitive adhesive layer is used. The separator can be made of an appropriate thin sheet by coating a peeling agent if required. Examples of a peeling agent include, for example, a silicone-based peeling agent, a long-chain alkyl-based peeling agent, a fluorine-based peeling agent, a peeling agent including molybdenum sulfide, or the like.

The above-described members forming a polarizing plate and an optical member, such as a polarizing film, a transparent protective film, an optical layer, and a pressure sensitive adhesive layer can have ultraviolet absorption power by treating with an ultraviolet absorber such as, for example, an ester salicylate compound, a benzophenone compound, a benzotriazole compound, a cyanoacrylate compound, a nickel complex salt compound, and the like.

The above-mentioned polarizing plate can be used for formation of various apparatus such as a liquid crystal display. The liquid crystal display can be produced as conventionally known structures, such as transmission type, reflection type, or a transmission-reflection type. A liquid crystal cell forming the liquid crystal display can be selected arbitrarily from appropriate cells such as active matrix driving type represented by a thin film transistor, a simple matrix driving type represented by a twist nematic type and a super twist nematic type.

When polarizing plates or optical members are provided on both sides of a liquid crystal cell, the polarizing plates or the optical members on both sides can be the same or different. Moreover, for forming a liquid crystal display, one or at least two layers of appropriate members such as a prism array sheet, a lens array sheet, an optical diffuser, or a backlight can be arranged at appropriate positions.

EXAMPLE

Hereinafter, the present invention will be explained more specifically with reference to Examples and Comparative Examples.

Example 1

FIG. 1 is a cross-sectional view showing a polarizing plate according to Example 1 of the present invention. In FIG. 1, an adhesive layer, which is usually used, is not shown.

TAC films 2 as protective layers having a thickness of 40 $\mu$m are attached to both surfaces of a polarizer 1 made of a 30 $\mu$m-thick PVA film containing iodine, while TAC films 3 as protective layers having a thickness of 40 $\mu$m are attached also to both sides of the polarizer 1. Thus, a polarizing plate was produced. The moisture permeability of this 40 μm-thick TAC film was 120 g/m²·24 h.

Example 2

Figure 2:
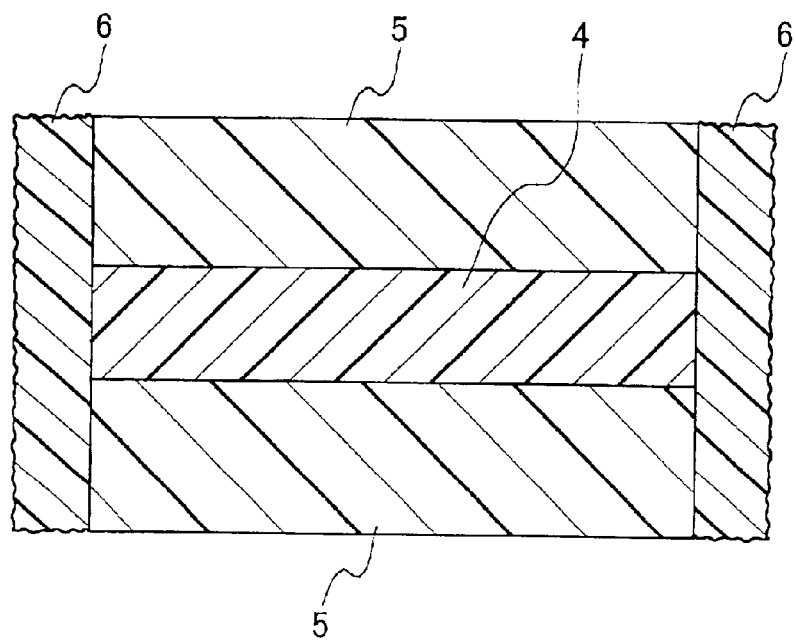
FIG. 2 is a cross-sectional view showing a polarizing plate according to Example 2 of the present invention.

FIG. 2 is a cross-sectional view showing a polarizing plate according to Example 2 of the present invention. In FIG. 2, an adhesive layer, which is usually used, is omitted.

TAC films 5 as protective layers having a thickness of 40 μm are attached to both surfaces of a polarizer 4 made of a 30 μm-thick PVA film containing iodine, while TAC resin 6 as protective layers having a thickness of 20 μm are coated on both sides of the polarizer 4. Thus, a polarizing plate was produced. The moisture permeability of this 20 μm-thick TAC resin was 0.59 g/m²·24 h.

Comparative Example 1

A polarizing plate was prepared by the same method as in Example 1 except that protective films are not attached on both sides of the polarizer.

Comparative Example 2

A polarizing plate was prepared by the same method as in Example 2 except that protective layers are not coated on both sides of the polarizer.

(Humidity Durability Test)

After the polarizing plates produced in Examples 1 and 2 and Comparative Examples 1 and 2 were left at a temperature of 60° C. and humidity of 95% for 100 hours, the rate of change in dimension of the polarizing plate in the longitudinal direction was measured. The rate of change in dimension was calculated from the following formula:

(dimension of polarizing plate in the longitudinal direction after left at humidity—dimension of original polarizing plate in the longitudinal direction)/(dimension of original polarizing plate in the longitudinal direction)×100.

Next, the polarizing plates produced in Examples 1 and 2 and Comparative Examples 1 and 2 were attached to a plastic cell (100 mm×100 mm) made of epoxy resin and left at a temperature of 60° C. and humidity of 95% for 100 hours, and thereafter maximum values of warping amount at four corners of the cell were measured.

Table 1 shows the results.

TABLE 1

|  | rate of change in dimension (%) | maximum value of warping amount (mm) |
| --- | --- | --- |
| Example 1 | 0.057 | 2.5 |
| Example 2 | 0.017 | 2.2 |
| Comparative Example 1 | 0.408 | 3.3 |
| Comparative Example 2 | 0.253 | 3.1 |

As is apparent from Table 1, in Examples 1 and 2, the rate of change in dimension is ±0.1% or less. On the other hand, in Comparative Examples 1 and 2, the rate of change in dimension is more than ±0.1%.

Furthermore, in Examples 1 and 2, the warping amount is ±3.0 mm or less. On the other hand, in Comparative Examples 1 and 2, the warping amount is more than ±3.0 mm.

These results show that in the polarizing plate of the present invention, the change in dimension is small even if it is left at high humidity for a long time, and there are no problems in handling of a panel when the liquid crystal panel is equipped.

As mentioned above, according to the present invention, all surfaces and sides of the polarizer are covered with low moisture-permeable layers having moisture permeability of 310 g/m²·24 h or less, and thus it is possible to provide a polarizing plate having an excellent humidity durability and a liquid crystal display using such a polarizing plate.

The invention may be embodied in other forms without departing from the spirit or essential characteristics thereof. The embodiments disclosed in this application are to be considered in all respects as illustrative and not limitative. The scope of the invention is indicated by the appended claims rather than by the foregoing description, and all changes which come within the meaning and range of equivalency of the claims are intended to be embraced therein.

What is claimed is:

1. A polarizing plate comprising a polarizer, wherein all surfaces and sides of the polarizer are covered with low moisture-permeable layers having moisture permeability of 310 g/m²·24 h or less, and each of the layers has a thickness of 40 μm or less, wherein a rate of change in dimension of the polarizer in a uniaxially stretching direction is ±0.1% or less after the polarizer is left at a temperature of 60° C. and humidity of 95% for 100 hours.

2. The polarizing plate according to claim 1, wherein the polarizing plate is formed into a size of 90 mm×90 mm and attached to a plastic cell having a size of 100 mm×100 mm and a thickness of 400 μm, the plastic cell comprising at least one selected from the group of a thermoplastic resin and a thermosetting resin, and when the cell is left at a temperature of 60° C. and humidity of 95% for 100 hours, an amount of warping at each of four corners of the cell is ±3.0 mm or less.

3. The polarizing plate according to claim 2, wherein the thermoplastic resin comprises at least one selected from the group consisting of polycarbonate, polyalylate, polyether sulfone, polysulfone, polyester, polymethyl methacrylate, polyetherimide and polyamide.

4. The polarizing plate according to claim 2, wherein the thermosetting resin comprises at least one selected from the group consisting of epoxy resin, unsaturated polyester, polydiallyl phthalate and polyisobonyl methacrylate.

5. The polarizing plate according to claim 1, wherein the Low moisture-permeable layers have moisture permeability of 0.59 g/m²·24 h or less.

6. The polarizing plate according to claim 1, wherein the rate of change is 0.057% or less.

7. The polarizing plate according to claim 1, wherein the rate of change is 0.017% or less.

8. A liquid crystal display comprising: a liquid crystal cell having a first side and a second side; and a polarizer having all surfaces and sides covered with low moisture-permeable layers having moisture permeability of 310 g/m²·24 h or less, and each of the layers has a thickness of 40 μm or less; the polarizer attached to at least one side of the liquid crystal cell, wherein a rate of change in dimension of the polarizer in a uniaxially stretching direction is ±0.1% or less after the polarizer is left at a temperature of 60° C. and humidity of 95% for 100 hours.

9. The liquid crystal display according to claim 8, wherein the polarizing plate is formed into a size of 90 mm×90 mm and attached to a plastic cell having a size of 100 mm×100 mm and a thickness of 400 μm, the plastic cell comprising at least one selected from the group of a thermoplastic resin and a thermosetting resin, such that when the cell is left at a temperature of 60° C. and humidity of 95% for 100 hours, an amount of warping at each of four corners of the cell is ±3.0 mm or less.

10. The liquid crystal display according to claim 9, wherein the thermoplastic resin comprises at least one selected from the group of polycarbonate, polyalylate, polyether sulfone, polysulfone, polyester, polymethyl methacrylate, polyetherimide and polyamide.

11. The liquid crystal display according to claim 9, wherein the thermosetting resin is at least one selected from the group of epoxy resin, unsaturated polyester, polydiallyl phthalate and polyisobonyl methacrylate.

12. A polarizing plate comprising a polarizer, wherein all surfaces and sides of the polarizer are covered with low moisture-permeable layers having moisture permeability of 310 g/m²·24 h or less, and wherein:

(i) after the polarizer is left at a temperature of 60° C. and humidity of 95% for 100 hours, a rate of change in dimension of the polarizer in a uniaxially stretching direction is ±0.1% or less, or (ii) after the polarizing plate is formed into a size of 90 mm×90 mm and attached to a plastic cell having a size of 100 mm×100 mm and a thickness of 400 μm, the plastic cell comprising at least one selected from the group of a thermoplastic resin and a thermosetting resin, and when the cell is left at a temperature of 60° C. and humidity of 95% for 100 hours, an amount of warping at each of four corners of the cell is ±3.0 mm or less.

13. The polarizing plate according to claim 12, wherein a rate of change in dimension of the polarizer in a uniaxially stretching direction is ±0.1% or less after the polarizer is left at a temperature of 60° C. and humidity of 95% for 100 hours.

14. The polarizing plate according to claim 12, wherein the polarizing plate is formed into a size of 90 mm×90 mm and attached to a plastic cell having a size of 100 mm×100 mm and a thickness of 400 μm, the plastic cell comprising at least one selected from the group of a thermoplastic resin and a thermosetting resin, and when the cell is left at a temperature of 60° C. and humidity of 95% for 100 hours, an amount of warping at each of four corners of the cell is ±3.0 mm or less.

15. The polarizing plate according to claim 14, wherein the thermoplastic resin comprises at least one selected from the group consisting of polycarbonate, polyalylate, polyether sulfone, polysulfone, polyester, polymethyl methacrylate, polyetherimide and polyamide.

16. The polarizing plate according to claim 14, wherein the thermosetting resin comprises at least one selected from the group consisting of epoxy resin, unsaturated polyester, polydiallyl phthalate and polyisobonyl methacrylate.

17. The polarizing plate according to claim 12, wherein the low moisture-permeable layers have moisture permeability of 0.59 g/m²·24 h or less.

18. The polarizing plate according to claim 17, wherein the rate of change is 0.057% or less.

19. The polarizing plate according to claim 17, wherein the rate of change is 0.017% or less.

20. A liquid crystal display comprising: a liquid crystal cell having a first side and a second side; and a polarizer having all surfaces and sides covered with low moisture-permeable layers having moisture permeability of 310 g/m²·24 h or less; the polarizer attached to at least one side of the liquid crystal cell, wherein:

(i) after the polarizer is left at a temperature of 60° C. and humidity of 95% for 100 hours, a rate of change in dimension of the polarizer in a uniaxially stretching direction is ±0.1% or less, or (ii) after the polarizing plate is formed into a size of 90 mm×90 mm and attached to a plastic cell having a size of 100 mm×100 mm and a thickness of 400 μm, the plastic cell comprising at least one selected from the group of a thermoplastic resin and a thermosetting resin, such that when the cell is left at a temperature of 60° C. and humidity of 95% for 100 hours, an amount of warping at each of four corners of the cell is ±3.0 mm or less.

21. The liquid crystal display according to claim 20, wherein a rate of change in dimension of the polarizer in a uniaxially stretching direction is ±0.1% or less after the polarizer is left at a temperature of 60° C. and humidity of 95% for 100 hours.

22. The liquid crystal display according to claim 20, wherein the polarizing plate is formed into a size of 90 mm×90 mm and attached to a plastic cell having a size of 100 mm×100 mm and a thickness of 400 μm, the plastic cell comprising at least one selected from the group of a thermoplastic resin and a thermosetting resin, such that when the cell is left at a temperature of 60° C. and humidity of 95% for 100 hours, an amount of warping at each of four corners of the cell is ±3.0 mm or less.

23. The liquid crystal display according to claim 22, wherein the thermoplastic resin comprises at least one selected from the group of polycarbonate, polyalylate, polyether sulfone, polysulfone, polyester, polymethyl methacrylate, polyetherimide and polyamide.

24. The liquid crystal display according to claim 22, wherein the thermosetting resin is at least one selected from the group of epoxy resin, unsaturated polyester, polydiallyl phthalate and polyisobonyl methacrylate.

* * * * *